Patented June 18, 1929.

1,717,614

UNITED STATES PATENT OFFICE.

GEORGE W. MILLER, OF CHICAGO, ILLINOIS, ASSIGNOR TO BAKELITE CORPORATION, OF NEW YORK, N. Y., A CORPORATION OF DELAWARE.

PHENOLIC RESIN AND PROCESS OF MAKING THE SAME.

No Drawing. Application filed March 1, 1927. Serial No. 171,910.

This invention relates to phenolic resins of the known type prepared by reaction between a phenolic body and furfural. Such resins have been heretofore commonly prepared by reaction between phenol and furfural, in presence of a catalyst, the resulting fusible resin being hardened by appropriate additions of methylene-containing hardening agents, such as formaldehyde, hexamethylenetetramine or the like.

According to the present invention, in its preferred embodiment, I first form a resinous condensation product by reacting upon cresol (including mixtures of cresols) with furfural, the reaction being carried out under a reflux and so controlled as to yield a highly fusible partial reaction product which does not, upon cooling, harden to a brittle mass, suitable for pulverizing and for incorporation into molding compounds. This reaction is carried out in presence of a basic condensing agent, preferably lime. Thereafter a further amount of the basic condensing agent is added, and the reaction carried to completion, so far as concerns the preparation of a resin which is hard and brittle when cold.

During the first reaction stage described above it is important to avoid the presence of material quantities of phenol which has a strong tendency in presence of furfural and lime, or equivalent basic condensing agents, to yield rubbery products which are not well adapted for use in this process, or for the manufacture of a final product of the desired characteristics. During the second reaction stage, on the contrary, I prefer to incorporate, along with the additional condensing agent, a fusible (non-reactive) phenolic resin, which may and preferably does carry considerable free phenol. At this stage either phenol-methylene or cresol-methylene resins may be employed, or indeed non-reactive resins of any kind, either natural or synthetic.

The product of the second reaction stage, whether or not a phenol resin is incorporated, is a relatively hard and brittle resin, which when compounded with appropriate fillers and hardening agents if necessary constitutes a mixture of excellent molding qualities.

Following is a preferred method of carrying out the invention, it being understood that it is not restricted to the particular proportions of materials, or to the manipulations described.

In the first reaction stage the cresol employed is as nearly as practicable free from phenol, the presence of which in substantial amounts is apt to lead to the formation of a rubbery infusible reaction product. The following proportions by weight are representative:

| | Parts. |
|---|---|
| Furfural | 100 |
| Cresol | 100 |
| Calcium hydroxide | 12 |

These materials are charged into a steam-heated still equipped with a refluxing condenser, the temperature raised to about 230° F., and the reaction continued for about an hour at or near this temperature. The resulting resin is still quite fluid at the reaction temperature and is readily discharged from the still. It does not, even when cooled, form a brittle, readily pulverizable mass suitable for compounding molding mixtures; but may be regarded as a partially-reacted resin in a condition highly sensitive to the influence of further additions of the basic condensing agent.

In order to complete the raction the hot resin from the still is run into an open kneading or mixing machine, provided with stirring devices, and with a heating jacket. A further addition of about 20 parts of hydrated lime is made to the charge, and the mass heated to about 300° F., is thoroughly beaten and mixed for about 15 minutes, or until it becomes viscous, and a sample cools to a hard and brittle mass.

During the beating or second reaction stage I may incorporate with the mass a lubricating agent such as stearic acid, and also other fusible resins, preferably a fusible or non-reactive resin of the known phenol-methylene type. Such resin may be added in widely varying proportions depending upon the qualities desired in the final product. Plasticizing or other additions may be introduced at the same time.

The resulting product, provided no non-reactive phenolic resin has been admixed, is rendered infusible and substantially insoluble in ordinary solvents by sufficient application of heat. In case it is admixed with a non-reactive phenolic resin an amount of hexamethylenetetramine or equivalent hardening agent sufficient to impart a reactive character to said admixed resin is preferably added. For use as a molding mixture it is compounded with the usual fillers, as wood flour and the like; and for use as a varnish, lacquer or impregnating liquid, with solvents appropriate to the particular purpose in view.

The process as described not only yields a resin of excellent physical, chemical and electrical properties, but is exceptionally efficient and economical in operation. During the first reaction stage the fluid reaction mixture is heated in the still under conditions involving very little loss of reagents; and the second reaction stage is carried out in a type of apparatus in which it may be carried rapidly to completion and from which the desired heavy, viscous product may be readily discharged.

Other basic condensing agents may replace the hydrated lime, for example the oxids of calcium or magnesium, and the carbonates or hydroxids of sodium and potassium, and the like.

I claim:

1. Process of making a phenolic resin, comprising reacting cresol with furfural in presence of a basic condensing agent until a fusible resinous condensation product is formed, adding thereto a further proportion of basic condensing agent, and continuing the reaction.

2. In a process of making a phenolic resin, the steps of effecting a reaction between cresol and furfural in a plurality of reaction stages in which a basic condensing agent is used in increasing proportion as the reaction proceeds.

3. Process of making a phenolic resin composition, comprising reacting cresol with furfural in presence of a basic condensing agent until a fusible resinous condensation product is formed, adding thereto a fusible resin and a further proportion of basic condensing agent, and continuing the reaction.

4. Process of making a phenolic resin composition, comprising reacting cresol with furfural in presence of a basic condensing agent until a fusible resinous condensation product is formed, adding thereto a non-reactive phenol-methylene resin and a further proportion of basic condensing agent, and continuing the reaction.

5. The hereindescribed phenolic resin composition comprising a resinous reaction product of cresol and furfural, and a phenol-methylene resin.

6. The hereindescribed phenolic resin composition comprising a resinous reaction product of cresol, furfural and a basic condensing agent, and another resin intimately incorporated therewith.

7. The hereindescribed phenolic resin composition comprising a resinous reaction product of cresol, furfural and a basic condensing agent, and a non-reactive phenol-methylene resin intimately incorporated therewith.

In testimony whereof, I affix my signature.

GEORGE W. MILLER.